Aug. 31, 1943.　　　A. W. LAING　　　2,328,153
TRIM TOOL
Filed Sept. 29, 1942　　　2 Sheets-Sheet 1
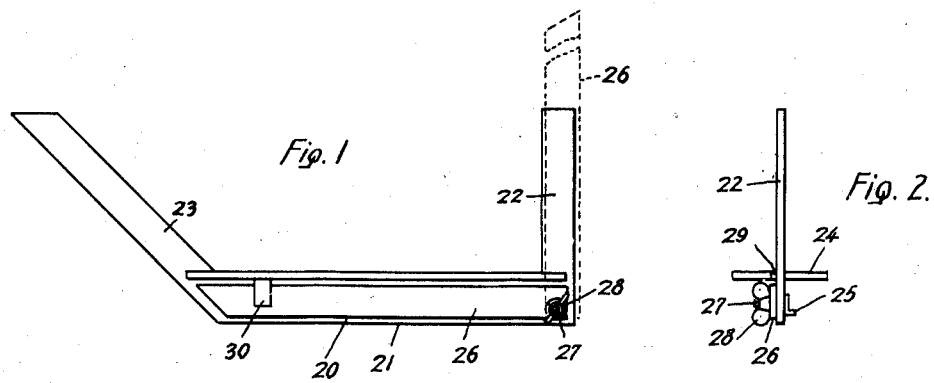
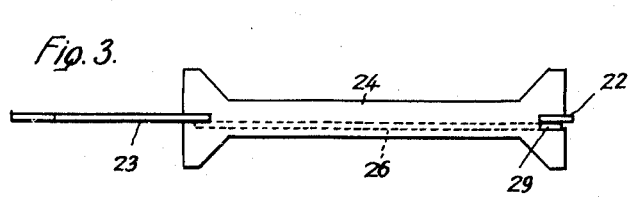
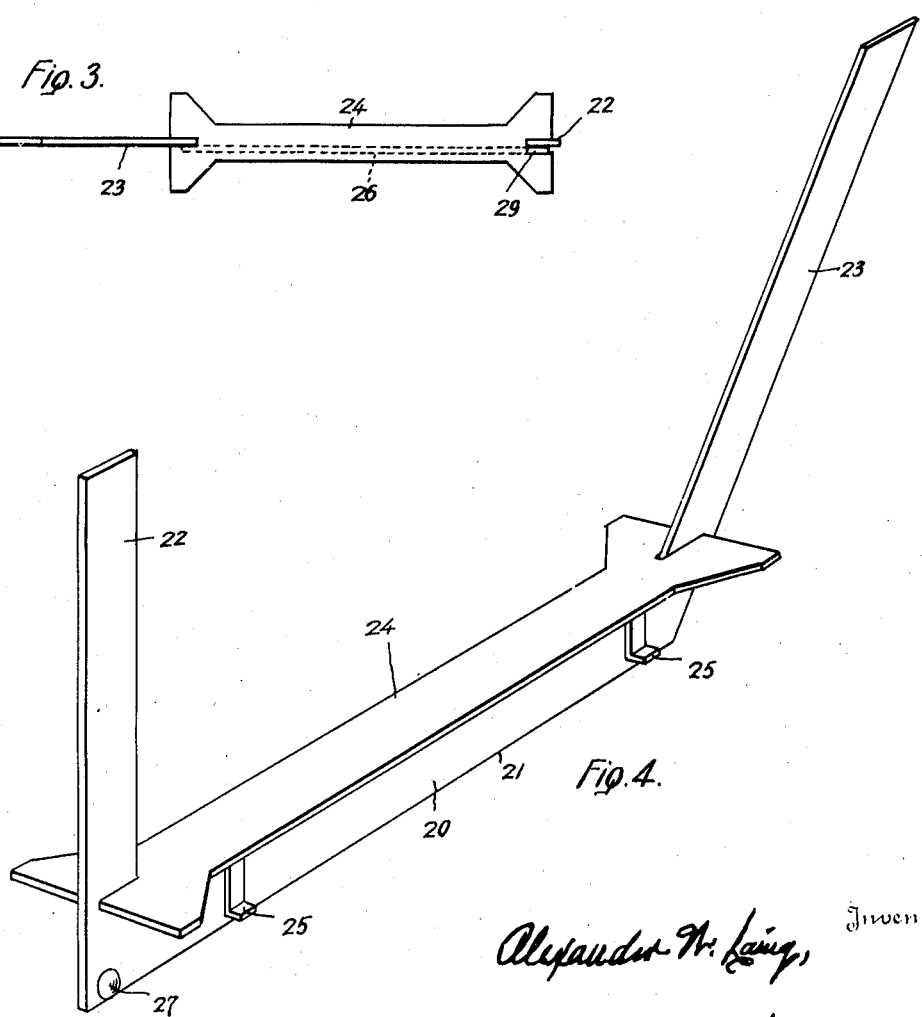

Aug. 31, 1943. A. W. LAING 2,328,153
TRIM TOOL
Filed Sept. 29, 1942 2 Sheets-Sheet 2
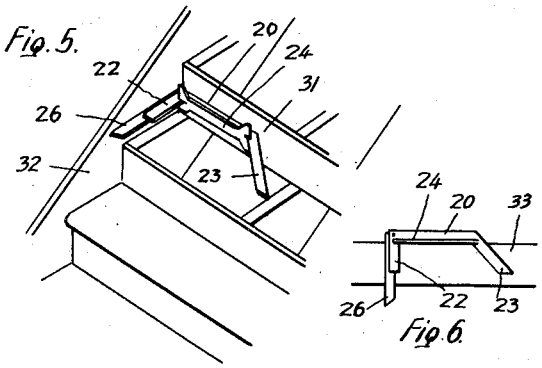
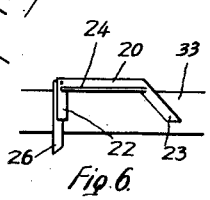
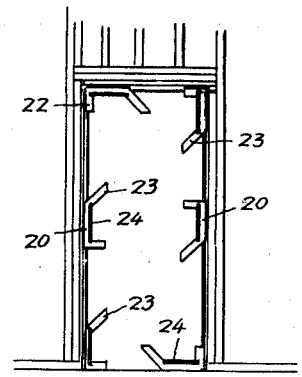
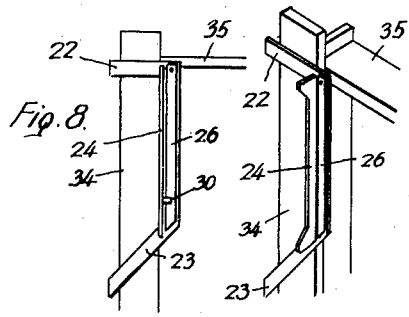
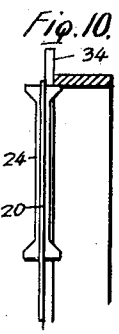
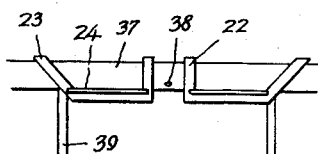
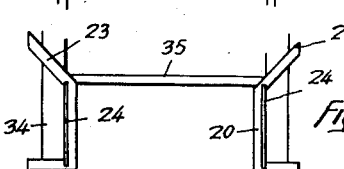
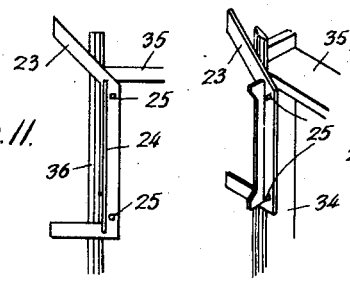
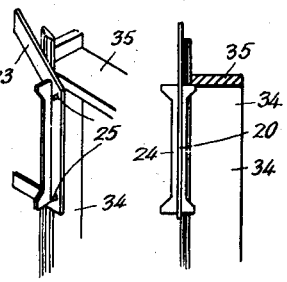
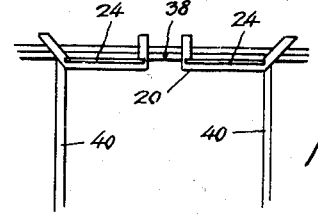
Alexander W. Laing, Inventor
By [signature]
Attorney Patented Aug. 31, 1943

2,328,153

UNITED STATES PATENT OFFICE 2,328,153

TRIM TOOL

Alexander W. Laing, Miami, Fla.

Application September 29, 1942, Serial No. 460,143

4 Claims. (Cl. 33—93)

This invention relates generally to tools for use by carpenters or cabinet makers, and particularly to tools for use in erecting the trim and casings of door or window frames, as well as for determining the angle of cut of a stair tread where it joins with the skirt board.

The invention aims primarily to provide a tool of extremely simple and economic construction by the use of which the artisan may quickly and accurately determine the angle and location of cut of door and window framing without resort to the practice heretofore of making accurate measurements. The invention also contemplates a tool by the use of which a reveal of predetermined depth may be indicated and laid out in the door frame without the necessity of accurately measuring such reveal as has heretofore been the practice. Similarly, the device of my invention embodies means whereby the proper angle of cut of the end of a stair tread may be immediately determined without resort to measurement, and which insures a snug fit of the tread with the skirt board regardless of the angle.

The invention will be best understood with reference to the drawings, wherein:

Fig. 1 is a side elevation of a trim tool constructed in accordance with the invention, Fig. 2 is an end elevation of the tool, Fig. 3 is a top plan view of the tool as shown in Fig. 1, Fig. 4 is a perspective view of the improved trim tool, Fig. 5 is a diagrammatic view, in perspective, illustrating the use of the tool in connection with the tread of stair steps, Fig. 6 is a plan view illustrating the manner in which the tool is used in marking off the angle of cut on a stair tread, Fig. 7 is a front elevation of a door frame in the course of construction and illustrating the various positions in which the tool is used in determining the proper reveal, Fig. 8 is an elevation showing the tool in position to mark the side casing where cabinet type trim is used, Fig. 9 is a detailed perspective view further showing the tool as applied in Fig. 8, Fig. 10 is a sectional view through the door frame and showing an edge view of the tool as used in Figs. 8 and 9, Fig. 11 is a front elevation showing the tool in position to mark the side casing when plaster mould trim is used, Fig. 12 is a perspective view showing the tool in the same position, Fig. 13 is a transverse sectional view through the door frame and showing an edge view of the tool as it will appear when used as in Figs. 11 and 12, Fig. 14 is a front elevation showing two positions for marking the length of the head casing where a forty-five degree angle of cut is desired, Fig. 15 shows the tool in two positions to mark the length of the side casing where mitered corners are desired, and Fig. 16 is a view similar to view 14 and showing the two positions of the tool for marking off the vertical stiles for mitered joints.

It is usually the practice in the erection of door frames to measure the side and head casings accurately so that a proper fit and snug joint will be assured where such casing members meet, and should such measurements vary from accurate, difficulties are experienced. In providing the reveal for door frames accurate measurement also is necessary, and it is essential that the reveal be uniform entirely around the frame. The tool of the present invention is so designed that its use will eliminate the necessity of accurate measuring as has heretofore been the practice, and the proper use of the trim tool will enable the door frames to be accurately laid out in a minimum of time and with assurance of proper matching and fit. This also applies to the reveal, as the use of the tool insures a uniform reveal entirely around the door.

In erecting stair steps, it frequently occurs that the angle between the apron and riser and tread and riser varies from the usual 90° angle, in which event it becomes necessary to make accurate and minute measurements so that the timbers may be cut in such manner as to insure a snug and proper fit. The tool of the present invention is so constructed as to lay off such varying angles with ease and with the assurance of a proper joint between the elements when the timbers are cut in accordance with the angle measurement laid out by the tool.

Referring now to the drawings, and particularly to Figs. 1 to 4 inclusive, the tool includes a base including a blade 20 having its lower edge 21 straight for ruling and marking purposes. This blade may be of a length best suited to the uses for which the tool is designed, and is thin and flat throughout its length. An arm 22 integral with the blade at one end of the latter projects at right angles thereto and is disposed in the same plane with the flat sides of the blade. This arm 22 has straight longitudinal edges for ruling purposes. A second arm 23 projects in the same general plane as the blade 20 from the opposite end thereof and is disposed at a 45° angle to the said blade. Both longitudinal edges of the arm 23 are straight and may be used for ruling purposes.

The upper edge of the base member 20 is provided with a butt plate 24, which plate is rigidly secured to the upper edge of the said blade and projects laterally from both sides of the latter at right angles thereto. The ends of the butt plate 24 are widened as shown and straddle the arms 22—23. It will be noted that the ends of the butt plate terminate inwardly from the outer edges of the arms 22—23 an equal distance, which distance is the equivalent of the reveal referred to above and which will be more fully discussed hereinafter. One side of the base member or blade 20 has secured thereon at spaced distances stops 25, which stops are spaced from the lower edge 21 of the blade 20 a distance equal to the distance between the ends of the butt plate 24 and the adjacent edges of the arms 22—23.

Pivotally mounted upon the blade 20 and on that side opposite to the stops 24 is an adjustable arm 26. This arm is formed of thin flat metal and its longitudinal edges are straight for ruling purposes. The adjustable arm receives a bolt 27 at one end, upon which is mounted a wing nut or adjusting screw 28, the construction enabling the arm to be swung upon the pivot 27 to various angles with relation to the blade 20 and held in such positions by tightening the nut. The butt plate 24 is cut away or recessed as at 29 near one end and in close proximity to the arm 22 to permit of the adjustable arm 26 being swung into parallelism with the said arm 22. The adjustable arm 26 is used only in determining or measuring angles which may vary, and when not in use for such purposes is swung back upon the base 20 so as to lie wholly within the edges of the latter, as shown in full lines in Fig. 1, and is held in such position by tightening of the nut 28 at one end of the arm and by a spring clip 30 secured to the base and releasably engaged with the said adjustable arm 26.

In the use of the tool for determining the angle of cut of a tread member of a stair case where the angle between the tread and the apron is greater or less than a right angle, reference is made to Figs. 5 and 6 of the drawings. To determine the angle of cut of the tread end, the adjustable arm 26 is swung upon its pivot into substantial parallelism with the arm 22, whereupon the straight edge 21 of the blade 20 is applied to the step riser 31 as shown in Fig. 5. The adjustable blade 26 is then moved upon its pivot until it lies flush and flatly abuts the apron 32, whereupon the nut 28 is tightened. The angle is thus properly obtained, and may be marked off upon the riser 33 by applying the tool as shown in Fig. 6. With the butt plate 24 engaged with the straight longitudinal edge of the riser, the angle indicated by the position of the arm 26 is marked. If a varying angle is present at the opposite end of the riser, the same procedure is followed except that the tool is reversed, as will be readily understood.

As has been before stated, the stops 25 are spaced from the edge 21 of the blade 20 a distance equal to the spacing of the ends of the butt plate 24 inwardly from the outer edges of the arms 22—23. This distance is the equivalent of the reveal it is desired the door frame shall have, and for the purpose of illustration in the present instance this distance may be stated as $\tfrac{5}{16}$ inch. With reference to Fig. 7 of the drawings it will be noted that the trim tool is illustrated diagrammatically in several positions around the trim, and by applying the tool in the manner shown with the stops 25 engaged with the face of the jamb, the blade 21 forms a straight edge for marking off the proper distance for the reveal.

With reference to Figs. 11, 12 and 13 the tool is shown as applied for marking the side casing 36 when plaster mould trim is used. In this instance, the 45° arm 23 determines the position of cut of the side casing 36.

In Fig. 14 the tool is shown diagrammatically in two positions for marking the length of the head casing 37, allowing for reveal and when cabinet trim is desired. The casing 37 is placed flush with the bottom of the underlying header and a temporary nail 38 at or near the center of the casing holds the latter in place. By applying the tool to the under or lower head casing 37 with the butt plate 24 as a head, and with the end of the said butt plate engaged with the jamb 39, the outer straight edge of the arm 23 will determine the line of cut for cabinet trim allowing for reveal.

By referring to Fig. 15, it will be observed that the tool is shown diagrammatically in two positions for measuring and marking the side casings. With the butt plate 24 engaged with the inner face of the side casing 34, and with the end of the butt plate engaged with the header 35, the outer straight edge of the arm 23 will determine the location of cut for the proper length of the said casing where mitered corners are desired and allowing for reveal.

Fig. 16 shows diagrammatically the application of the trim tool for determining the angle of cut of the upper edges of the face plates 40 for the frame.

From the foregoing it is apparent that the tool may be quickly and easily used at the various places upon the frame to determine accurately where cuts should be made to permit of proper joining of the various members constituting the frame and insuring a proper reveal entirely around the frame. The tool may be made of light inexpensive metal and comprises but few easily formed and readily assembled parts. The tool may be carried very conveniently in the ordinary carpenter's or cabinet maker's tool kit, and will prove thoroughly reliable and efficient in accomplishing the results for which it is designed. It will be understood that the ends of the butt plate 24 and the location of the stops 25 will be determined by the depth of reveal required for the work at hand.

What is claimed is:

1. In a trim tool, a base comprising a blade, an arm integral with said blade in the same plane with the latter and disposed at an angle to said blade, said arm having a marking edge, and a stop on said blade projecting laterally therefrom and out of the plane of said blade and located at a predetermined distance inwardly of the blade from said marking edge.

2. In a trim tool, a base comprising a blade, straight edge arms integral with and in the same plane with said blade and disposed at angles to said blade, stops projecting laterally from said blade and disposed equal distances inwardly from the straight edges of said arms, and additional stops on one side of said blade disposed similar distances inwardly from the straight edge of the blade.

3. In a trim tool, a base comprising a blade having a straight marking edge, stops projecting laterally from one side of said blade predetermined distances from the straight edge of the latter, straight edge arms integral with the blade in the same plane with the latter and having marking edges disposed at angles to said blade, and additional stops on said blade projecting laterally therefrom and disposed inwardly from the working edges of said arms distances equal to the distances between the first mentioned stops and the straight edge of said blade.

4. In a trim tool, a base comprising a blade having a straight marking edge, a butt plate secured to the opposite edge of said blade and projecting laterally from said blade and at right angles thereto, arms at the ends of said blade in the same plane with the latter and disposed at angles to the said straight edge, the said butt plate having its ends terminating equal distances inwardly from the outer edges of said arms, and stops on said blade disposed inwardly from the straight edge thereof a distance equal to the distance between said butt ends and the adjacent edges of said arms.

ALEXANDER W. LAING.